July 26, 1938.   J. HEDIN   2,125,023
VENTILATOR FOR MOTOR CARS AND THE LIKE
Filed March 20, 1936
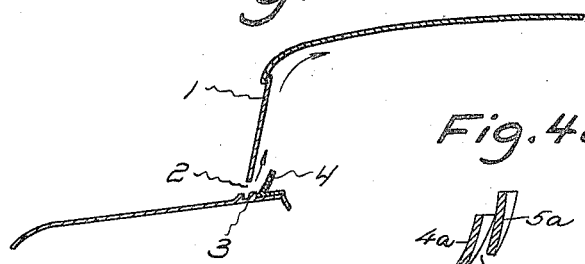
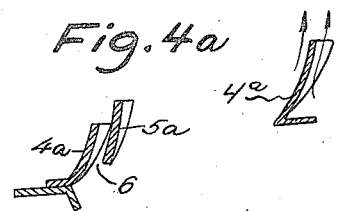
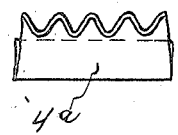
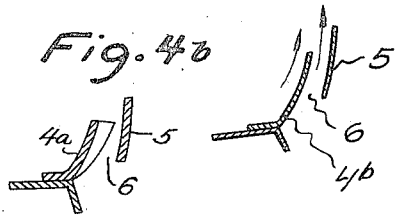
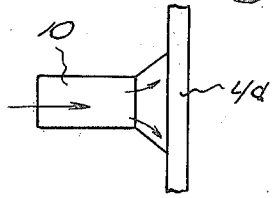
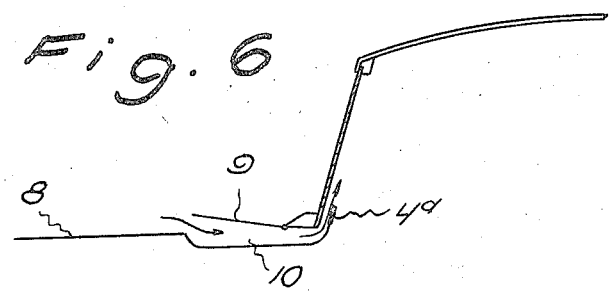
INVENTOR
JOHN HEDIN
BY Emil Bönnehycke
ATTORNEY Patented July 26, 1938

2,125,023

UNITED STATES PATENT OFFICE 2,125,023

VENTILATOR FOR MOTOR CARS AND THE LIKE

John Hedin, Mariestad, Sweden

Application March 20, 1936, Serial No. 69,955
In Sweden July 17, 1935

8 Claims. (Cl. 296—94)

The present invention refers to a draughtless ventilation means for motor cars and the like provided with closed bodies and having air inlets for introduction of fresh air under pressure due to the movement of the vehicle.

In recent years, the importance of efficient ventilation means for closed motor cars and the like has been more and more appreciated, and several attempts have been made for solutions of this problem. Generally it has been overlooked, however, that a completely efficient ventilation means which is also suitable in cold weather must inevitably fulfil all of the fundamental conditions stated hereinafter for serving its purpose:

(1) Upon the movement of the vehicle, the fresh air must be permitted to freely flow into the closed car body at a considerable speed and active force and in substantial quantities, so that a sufficient increase of pressure is created within the interior of the car body, whereby the foul inner air is forced out and gasoline and oil fumes from the engine are effectively prevented from entering the car body.

(2) The air flowing into the car body must be directed along the walls or roofing etc. within said body in such a manner that a good admixture with the inner air and a reduced velocity of the flow is effected adjacent to the said portions of the car body, so that the passengers do not come in contact with the inflowing air until its velocity has been sufficiently reduced, and until a sufficient admixture with the inner air and an equalization of the temperature have been obtained.

(3) Furthermore, the inflowing air must be introduced in the form of thin layers of small jets etc., in case a sufficiently forceful ventilation shall be possible without inconvenient draught, which is especially important in cold weather, so that an efficient admixture with the inner air, a reduction of velocity and an equalization of temperature shall be obtained in such portions of the car body, at which the air flow cannot come in contact with the passengers. This object may be still more facilitated by air introduction means having an injector action, and such means may be of different constructions and adapted to act in such a manner that the incoming air flow forces with it increased quantities of the inner air, whereby a more effective mixing action and an increased reduction of the velocity of the incoming air, or the air mixture, is obtained.

In the proposals hitherto made for the purpose, one or more of the fundamental conditions for obtaining an efficient ventilation, as referred to above, have been overlooked. A great number of the ventilation means previously proposed are, for instance, constructed in such a way that a vacuum is created within the car body instead of an increased pressure. Even in case the ventilation should be sufficient and relatively draughtless by such means, the result as a whole will nevertheless be greatly unsatisfactory due to the reduced pressure within the car body, which directly results in a sucking in of gasoline and oil fumes from the engine. All of the devices working according to this principle will therefore result in an unpleasant and unhealthy, or even dangerously sleep-conducive, gas mixture within the car body, and due to this circumstance such ventilation means are particularly objectionable.

In the previously proposed ventilation means, in which the fresh air is introduced into the car body in a manner so that an increased pressure is created therein, the fundamental conditions referred to under (2) and (3) above have not been sufficiently taken in consideration, such conditions being inevitable for elimination of unpleasant draught. The specific means hinted at under (3) above and adapted for a more rapid and effective distribution of the air etc. are perhaps not entirely indispensable in warm weather, as the draught will then be less perceptible, but an all-round efficient ventilation means must also be serviceable in cold weather, and therefore it is nevertheless of a great importance that the means referred to under (3) are also employed.

According to the present invention all of the fundamental conditions referred to above are taken in consideration, and the invention eliminates the drawbacks inherent in the ventilation means previously proposed for the same purpose.

In the following, the invention will be described by reference to the accompanying drawing in which:

Figure 1 is a diagrammatic vertical sectional view of a vehicle body embodying the present invention.

Fig. 2 is a vertical sectional view showing a modified baffle.

Fig. 3 is a fragmentary plan view of the baffle of Fig. 2.

Fig. 4 is a fragmentary vertical sectional view showing another modification.

Figs. 4a and 4b are views similar to Fig. 4 showing further modifications.

Fig. 5 is a view similar to Fig. 4 showing a further modification.

Fig. 6 is a view similar to Fig. 1 showing still another modification.

Fig. 7 is a plan view of the structure shown in Fig. 6.

In the drawing, Fig. 1 is assumed to show a vertical section through the upper portion of the forward end of a motor car body provided with a wind shield 1 adapted to be displaced in suitable guides substantially in a vertical direction, so that the atmospheric air is introduced due to the velocity of the vehicle, when the lower edge 2 of the wind shield has been slid upwards from its tightening strip 3. The incoming air flow will take the direction indicated by arrows in the figure, and it will pass between the said strip and the lower edge of the wind shield.

Now, in case there was no specific means at hand, the said air flow would naturally pass substantially in a horizontal direction striking the passengers and causing a strong, inconvenient and unhealthy draught. For prevention thereof according to the invention, a direction changing means 4 in the shape of a rather low baffle shield or the like extending transversely of the car is provided at a little distance behind the air inlet proper. This baffle shield or the like can simply consist of an angle-bent plate the front side of which ought preferably to be a little concave in vertical cross section for obtaining a soft and uniform change of direction of the air flow, so that the latter is caused to sweep along upwardly and adjacent to the wind shield 1 without striking the passengers. Immediately above the upper edge of the baffle shield 4, the fresh air flow will take the shape of a relatively thin and rapidly moving layer, and this air layer will have a substantial injector action on the interior air within the car body, so that a substantial amount of the interior air will be swept up together with the fresh air and admixed therewith. Thereupon the air mixture is again caused to change its direction along the car body roofing, and also to be further admixed with the interior air, while the velocity of the mixed air flow is successively decreased. When the mixed air flow has been caused to change its direction several times, and to be thoroughly admixed with further amounts of the interior air before it gets an opportunity to strike the passengers, the velocity of the flow has also been decreased to such an extent that it cannot cause any inconvenient draught.

Apart from the concavity mentioned above, which is not inevitably necessary, the baffle shield 4 ought preferably to be positioned in a slight inclination rearwardly and inwardly in the car body, and the height of the same need not generally exceed 1½". Therefore, it may be conveniently mounted in any common motor car without obscuring the field of vision in forward direction. In practice it has been found that a shield of this type will prevent inconvenient draught, even in case the wind shield should be raised to such an extent that the lower edge of the same takes a position a little above the upper edge of the baffle shield. This result is due to the fact that the portion of the air flow, which is turned upwardly by the shield 4, will act to change the direction also of the other portion of the air flow otherwise tending to enter the car body in horizontal direction, so that both of said air flow portions are directed upwardly, though not so very close to the wind shield but sufficiently for not striking the passengers.

Hence, by means of the construction described, the car body will be effectively ventilated substantially without any draught at all, and in case the side windows of the car body are kept substantially closed a more or less pronounced increase of pressure will be created within the car body due to the velocity of the incoming air, such increased air pressure preventing the entrance of smelling and unhealthy fumes from the engine compartment located in front of the car body proper. Besides, the air flow adjacent to the wind shield will also, to a certain extent, prevent the clouding of the same with moisture, this being especially true in respect of the lower portion of the wind shield, which is by far of the greatest importance in modern cars for a free view in forward direction. This result is due to the fact that the difference in temperature and moisture content between the outer and the inner air is considerably reduced especially at the lower portion of the wind shield.

In the drawing, Fig. 2 shows a modification of the baffle shield for changing the direction of the air flow, seen in cross section, and Fig. 3 shows a portion of this modified baffle shield seen from above. This modification differs from the device shown in Fig. 1, in that the said shield 4a is corrugated in the direction of air flow, so that the entering fresh air is subdivided into a number of branch flows corresponding to the number of corrugations, such branch flows being directed upwardly along the inside of the wind shield just in the same manner as described in the foregoing, and they enter the car body without causing inconvenient draught.

The injector action is increased by subdivision of the incoming air into branch flows in the manner just described, this being due to the fact that the branch flows entering the car body in front of the baffle shield 4a will also sweep with them the intermediate branch flows of the interior air on the rear side of said shield. Hereby a correspondingly increased mixing action is also obtained, and the entering air will mix with the interior air more rapidly and effectively than otherwise, the velocity of the air mixture being also reduced, as the volume of the interior air to be set in motion is greater adjacent to the entrance for the fresh air. Besides the employment of the corrugations just described will also result in a more uniform distribution of the incoming air to the whole width of the car body, in case the exterior wind conditions should be such that they would tend to press the incoming air flow towards one side of the car body, for instance a head-wind inclined to the direction of travel.

The formation of the corrugations of the baffle shield 4a may be of such a kind that the chutes formed by the said corrugations have a depth which decreases successively in downward direction, so that the cross sectional area of such chutes successively increases inwardly. In other words, the chutes at the front side of the baffle shield 4a might be given a downwardly tapering shape.

In the drawing, Figs. 4, 4a and 4b show other modifications of the baffle shield means adapted to be employed whether the shield 4a is smooth according to Fig. 1 or corrugated according to Figs. 2 and 3. In this modification, an additional shield or guide plate 5 is mounted behind the shield 4b, so that a space is formed between them, such space 6 being open at both sides towards the interior of the car body. By this means, the injector action of the incoming fresh air on the interior air in the car body will be still more pronounced, especially if the upper edge of the additional plate 5 extends a little above the corresponding edge of the actual direction changing baffle shield 4, as indicated in the drawing. Hereby the admixture of the fresh air with the interior air becomes more effective, but in other respects the manner of action will be the same as described above.

In case the baffle shield is corrugated as in Figs. 4a and 4b, the guide plate 5 or 5a may also, though not necessarily, be corrugated in the same manner, and in such case the corrugations ought preferably be positioned in a manner so that the free space between the baffle shield and the guide plate is substantially uniform throughout in the transverse direction of the car.

In the drawing, Fig. 5 shows still another modification of the invention seen in vertical cross section. In this instance an additional baffle shield 7 is positioned at a little distance behind the front baffle shield 4c, which is analogous with the baffle shield described above. In one suitable manner or another the shield 4c is perforated or provided with apertures 11, but the shield 7 is unbroken, and the lower edge of the same is connected with the corresponding edge of the shield 4c without an opening towards the interior of the car body. In case it should be considered suitable, the upper edge of the shield 7 may be positioned at a level a little above the corresponding edge of the shield 4c, substantially as shown in Fig. 4. The manner of action of this modification will be the same as described above, but by means thereof the cross sectional area of the upwardly directed fresh air flow will be increased and result in a correspondingly decreased velocity of the flow, especially at the inner strata of the same. Hereby the incoming fresh air will be given an increased period of time for efficient admixture with the interior air within the car body before entering the innermost portions of the latter. In case it is desired, it is also possible to mount two or more perforated shields or screens 4c in advance of the full shield 7, and the shields may be smooth or corrugated in the manner described above.

In all of the modifications of the invention described above, it is naturally irrelevant whether the wind shield 1 is intended to be opened by displacement in its own plane or by a tilting motion around an axis at its upper edge. The main point is that it is possible by one movement or another of the wind shield to provide an entrance opening for the fresh air in advance of the baffle means described. Hence, the same constructions as described above are also applicable for instance in connection with wind shields, or parts thereof, hingedly mounted at their upper edges. In such instances the baffle shield means may be mounted so as to be in contact with the wind shield when the latter is taking a closed position, or in case of more shields being positioned behind each other, the foremost of them may be mounted in such a position.

The conditions will be a little different, however, in case the wind shield is mounted so as to take a fixed position, and an embodiment of the invention adapted for such instances is shown in Fig. 6, this figure showing a vertical section of the car body substantially as shown in Fig. 1. Corresponding reference letters as those used above are also used in Fig. 6, and Fig. 7 shows a plan view of the fresh air inlet according to Fig. 6.

The wind shield 1 is supposed to take a fixed or non-movable position, and the baffle shield 4d, which may be constructed according to any of the embodiments described above, is also mounted in a fixed position. In a manner known per se, the engine housing 8 is provided with a controllable air flap 9 hingedly mounted at its rear edge, so that the flap acts catching on the incoming air. Beneath this air flap 9, the engine housing is provided with a closed air box 10, which by suitable channel means is connected to the space between the wind shield 1 and the baffle shield 4d but sealed from any communication with the rest of the interior of the vehicle. In connection with the foregoing it is supposed to be superfluous here to describe the manner of action of this embodiment, but it is evident that such action will be substantially the same irrespective of the positioning of the fresh air intake flap 9, and with the same result it may also be positioned for instance at one side (or perhaps two combined air flaps at both sides) of the engine casing.

In all of the embodiments of the invention described, the arrangements are of such a kind, that the incoming fresh air flow is at first caused to change its direction so as to pass along the inside of the wind shield and thereafter along the car body roofing etc. into the interior of the car body. Although these embodiments are to be preferred, for instance for counteraction of a clouding of the wind shield, the incoming fresh air flow may also be at first directed along the car body roofing, or other portions of the car body walls, windows, etc. in order not directly to strike the passengers until the velocity of the flow has been sufficiently decreased for elimination of draught.

In such instances a controllable fresh air intake of the common kind may be mounted for instance at the upper edge of the wind shield instead of at the lower edge of the same, and the incoming fresh air flow may be directed towards both sides along the car body roofing, for instance by means of an air distribution box having a relatively small width in relation to the width of the body roof, and extending inwardly below the roof to a certain extent. In its side walls this distribution box may be provided with apertures (perforations) for the air, or any of the means described above and adapted for changing the direction of the fresh air and for its admixture with the interior air, so that the fresh air is brought to enter the car body in transverse direction along the roofing. Hence, in this instance, the fresh air will at first be directed along the car body roofing and thereafter downwardly along the side walls thereof etc. without striking the passengers. An air distribution box of this kind ought naturally not by necessity to be mounted at the front edge of the car body roof, and it need not by necessity have any substantial extension in the longitudinal direction of the car. In case an air intake flap is provided for instance in the body roof at a little distance from the front edge of the same, the air distribution box may be mounted in a corresponding position. In any case, the distribution of the fresh air within the car body, and its admixture with the interior air will nevertheless take place in a substantially similar manner to that described above in connection with the other embodiments of the invention.

What I claim and desire to secure by Letters Patent is:

1. In a device of the character described, a closed vehicle body including a windshield and having a slot extending transversely across the front of the vehicle at the bottom of said windshield for the introduction of air into said body upon the forward movement thereof, a narrow air flow directing baffle coextensive with said slot, having its upper edge at a level above the upper edge of the slot and being spaced rearwardly from the lower edge of the windshield a distance substantially equal to the width of said slot to direct air entering said slot exclusively upwardly along the inner surface of the windshield and rearwardly along the under surface of the top of the body, and a second narrow baffle spaced rearwardly from the aforementioned baffle, the space between the two baffles being open vertically both upwardly and downwardly.

2. In a device of the character described, a closed vehicle body including a windshield and having a slot extending transversely across the front of the vehicle at the bottom of said windshield for the introduction of air into said body upon the forward movement thereof, a narrow air flow directing baffle coextensive with said slot, having its upper edge at a level above the upper edge of the slot and being spaced rearwardly from the lower edge of the windshield a distance substantially equal to the width of said slot to direct air entering said slot exclusively upwardly along the inner surface of the windshield and rearwardly along the under surface of the top of the body, and a second narrow baffle spaced rearwardly from the aforementioned baffle, the space between the two baffles being open vertically both upwardly and downwardly, said second baffle being positioned with its upper edge above the upper edge of the first baffle.

3. In a device of the character described, a closed vehicle body including a windshield and having a slot extending transversely across the front of the vehicle at the bottom of said windshield for the introduction of air into said body upon the forward movement thereof, a narrow air flow directing baffle provided with substantially vertical corrugations and positioned coextensive with said slot, having its upper edge at a level above the upper edge of the slot and being spaced rearwardly from the lower edge of the windshield a distance substantially equal to the width of said slot to direct air entering said slot exclusively upwardly along the inner surface of the windshield and rearwardly along the under surface of the top of the body, and a second narrow baffle spaced rearwardly from the aforementioned baffle, the space between the two baffles being open vertically both upwardly and downwardly.

4. In a device of the character described, a closed vehicle body including a windshield and having a slot extending transversely across the front of the vehicle at the bottom of said windshield for the introduction of air into said body upon the forward movement thereof, a narrow air flow directing baffle provided with substantially vertical corrugations and positioned coextensive with said slot, having its upper edge above the upper edge of the slot and being spaced rearwardly from said slot to direct air entering said slot exclusively upwardly along the inner surface of the windshield and rearwardly along the under surface of the top of the body, and a second narrow baffle provided with substantially vertical corrugations and spaced rearwardly from the aforementioned baffle, the space between the two baffles being open vertically both upwardly and downwardly.

5. In a ventilation device according to claim 4, in which the corrugations of the two baffles are positioned in register with one another, so that the space between the baffles is substantially uniform for the whole length of the same.

6. In a device of the character described, a closed vehicle body including a windshield and having a slot extending transversely across the front of the vehicle at the bottom of said windshield for the introduction of air into said body upon the forward movement thereof, a narrow air flow directing baffle provided with substantially vertical and downwardly converging corrugations and positioned coextensive with said slot, having its upper edge at a level above the upper edge of the slot and being spaced rearwardly from the lower edge of the windshield a distance substantially equal to the width of said slot to direct air entering said slot exclusively upwardly along the inner surface of the windshield and rearwardly along the under surface of the top of the body, and a second narrow baffle spaced rearwardly from the aforementioned baffle, the space between the two baffles being open vertically both upwardly and downwardly.

7. In a device of the character described, a closed vehicle body including a windshield and having a slot extending transversely across the front of the vehicle at the bottom of said windshield for the introduction of air into said body upon the forward movement thereof, a narrow air flow directing baffle provided with substantially vertical and downwardly converging corrugations and positioned coextensive with said slot, having its upper edge above the upper edge of the slot and being spaced rearwardly from said slot to direct air entering said slot exclusively upwardly along the inner surface of the windshield and rearwardly along the under surface of the top of the body, and a second narrow baffle also provided with vertical and downwardly converging corrugations and spaced rearwardly from the aforementioned baffle, the space between the two baffles being open vertically both upwardly and downwardly.

8. In a ventilation device according to claim 7, in which the corrugations of the two baffles are positioned in register with one another, so that the space between the two baffles, when measured in the same horizontal plane, is substantially uniform for the whole length of the baffles.

JOHN HEDIN.